D. W. DORRANCE.
ARTIFICIAL LIMB.
APPLICATION FILED OCT. 19, 1920.
1,387,133.
Patented Aug. 9, 1921.
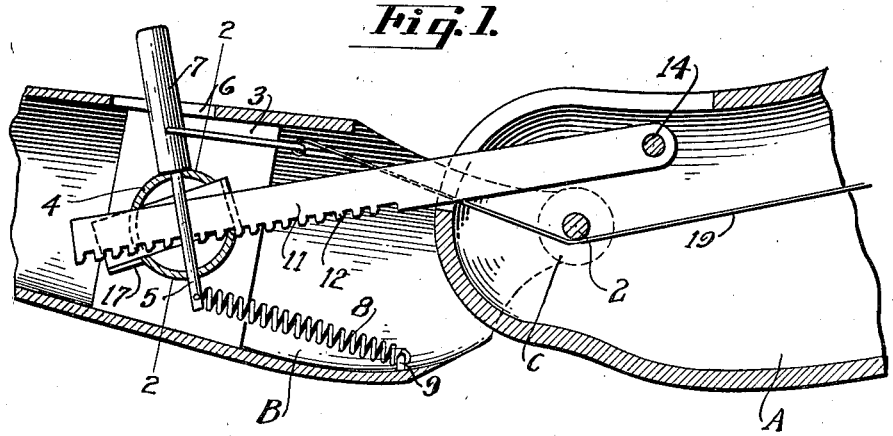
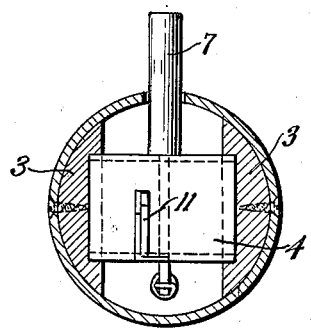
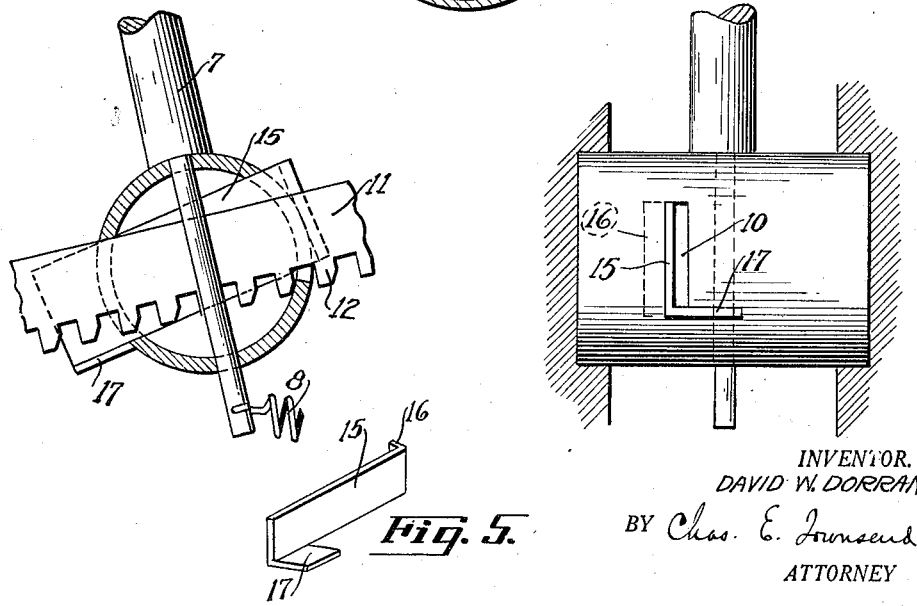
INVENTOR.
DAVID W. DORRANCE
BY Chas. E. Townsend.
ATTORNEY

UNITED STATES PATENT OFFICE.

DAVID W. DORRANCE, OF SAN JOSE, CALIFORNIA.

ARTIFICIAL LIMB.

1,387,133.

Specification of Letters Patent.    Patented Aug. 9, 1921.

Application filed October 19, 1920. Serial No. 417,991.

*To all whom it may concern:*

Be it known that I, DAVID W. DORRANCE, a citizen of the United States, residing at San Jose, in the county of Santa Clara and State of California, have invented new and useful Improvements in Artificial Limbs, of which the following is a specification.

This invention relates to artificial limbs, and especially to an elbow lock for artificial arms.

In the construction of artificial arms, and especially such as employed in an elbow joint, considerable trouble is encountered when the wearer attempts to employ certain tools or to accomplish certain work. This is due to the fact that the elbow joints in general use are not sufficiently substantial and do not permit any force to be applied. Varying forms of friction joints and locks have been employed to overcome this difficulty, but they are not readily operated.

One of the objects of the present invention is to overcome the difficulties specified by providing an elbow lock which is not only simple and substantial in construction but which may be readily and quickly operated.

Another object of the invention is to provide an elbow lock, which permits free movement of the arm and which permits locking of the elbow joint in any position desired.

Another object of the invention is to provide an elbow joint which automatically locks itself, and which may be released either by shoulder movement or by a releasing lever as will hereinafter be described.

Further objects will hereinafter appear.

The invention consists of the parts and the construction, combination and arrangement of parts as hereinafter more fully described and claimed, having reference to the accompanying drawings, in which—

Figure 1 is a longitudinal section of an artificial arm showing the application of the elbow lock.

Fig. 2 is a cross section on line 2—2, Fig. 1.

Fig. 3 is an enlarged longitudinal section of the cylindrical pawl whereby the rack bar is guided and locked.

Fig. 4 is an exterior view of the cylindrical pawl.

Fig. 5 is a perspective view of the guide plate.

Referring to the drawings in detail, A indicates the upper section of an artificial arm, B the lower section, and C the lower joint connecting the same. The upper arm section partially enters the lower arm section and is connected therewith by a pin 2 about which the lower section swings; this section pin in reality forming the pivot about which the elbow joint swings.

Suitably secured within the lower arm section B is a pair of bearing members 3, and turnably mounted between said bearing members and supported by the same is a cylindrical pawl 4. Extending through the cylindrical pawl is a rod 5, and secured to the upper end thereof and projecting through a slot 6 in the arm section B is a trip lever 7. Secured to the lower end of the rod 5 is a spring 8, the opposite end of which is attached to the arm as at 9; this spring serving the function of normally retaining the cylindrical pawl in locking position.

Formed in the opposite sides of the cylindrical pawl are alined slots 10, and extending through the slots and the cylindrical pawl proper is a rack bar 11 on which are formed teeth 12. This rack bar is pivotally attached to the arm section A as at 14 and forms, in conjunction with the cylindrical pawl, a locking mechanism whereby the lower arm section B may be secured at any point intermediate to that shown in Fig. 1 and a right angular position. In other words, the lower arm section B has a movement of approximately 90° and may be practically locked at any intermediate point.

To permit free sliding movement of the rack bar through the cylindrical pawl, and furthermore to effectively guide the same, I provide a guide plate 15. This plate extends through the slots 10 and is secured against endwise movement by an end flange 16 and by a supporting plate 17. This plate is disposed in front of the forward slot 10 and is so positioned that it serves as a support for the rack bar to the extent that it permits the teeth 12 formed thereon from dropping into engagement with the forward edge of the pawl. The rear flange 16 however is bent sidewise as shown and as such permits the teeth of the rack bar to drop into engagement with the pawl as shown in Figs. 1 and 3.

In actual operation we will assume that the arm is applied to an individual who has lost one arm and that he is therefore capable of operating the trip lever 7. If the individual should desire to swing the lower arm B to a certain angular position, he releases the lever 7 by pulling it rearwardly in the direction of arrow *a*. This causes the cylindrical pawl to swing in the same direction, thereby moving the supporting plate 17 up into engagement with the rack bar and simultaneously the pawl section 18 out of engagement with the teeth of the rack bar. The arm section B may, the moment the pawl is released, be swung to any angular position desired and is here instantly locked by merely releasing the trip lever 7 as a pull of the spring 8 will be sufficient to restore the cylindrical pawl to locking position. The rack bar 11 forms a substantial connection between the two arm sections when an adjustment has been made, and will rigidly support the arm sections in said position as long as required.

By referring to Fig. 1, it will be seen that a cord 19 is employed and that this cord is attached to the trip lever 7. This cord is passed around the back or across the chest of the wearer and suitably secured to the opposite shoulder and will when this shoulder is moved exert a pull sufficient to swing the trip lever to releasing position. Such a cord may or may not be employed as desired, but will of course be more or less necessary if an individual has lost both arms.

The cylindrical pawl here shown is not only simple and substantial in construction, but it is readily and quickly operated either by a pull on the cord 19 or on the lever 7, it being automatically swung to locking position the moment either is released due to the constant pull of the spring 8. The cylindrical pawl does not only serve the function of a pawl but also that of a guide for the forward end of the rack bar. Disengagement of the rack bar with relation to the pawl is thus prevented and alinement of the teeth in the pawl is always insured so that the device can never fail in operation.

While certain features of the present invention are more or less specifically illustrated, I wish it understood that various changes in form and proportion may be resorted to within the scope of the appended claims, similarly that the materials and finish of the several parts employed may be such as the experience and judgment of the manufacturer may dictate or varying uses may demand.

Having thus described my invention, what I claim and desire to secure by Letters Patent is—

1. The combination with the upper and lower arm section of an artificial arm and an elbow joint connecting the same, of a rack bar pivotally attached to the upper arm section and extending downwardly into the lower arm section, a tubular cylindrical member extending crosswise of the lower arm and having a limited turning movement therein, said cylinder having a pair of opposed slots formed therein through which the rack bar extends, means normally holding the cylinder in a position where the bottom edge of one of the slots will engage the teeth of the rack bar, and other means for turning the cylinder to disengage the teeth.

2. The combination with the upper and lower arm section of an artificial arm and an elbow joint connecting the same, of a rack bar pivotally attached to the upper arm section and extending downwardly into the lower arm section, of a cylindrical rotary pawl engageable with the rack bar to rock the same, means for normally maintaining the pawl in locking position, and manually actuated means for releasing the pawl.

3. The combination with the upper and lower arm section of an artificial arm and an elbow joint connecting the same, of a rack bar pivotally attached to the upper arm section and extending downwardly into the lower arm section, a cylindrical lever turnably mounted in the lower arm section, opposed slots formed in said cylindrical member through which the lower end of the rack bar extends, a pawl member formed in the cylinder engageable with the teeth of the rack bar, means for normally holding the pawl member in engagement with the teeth of the rack bar, and manually actuated means for turning the cylindrical member to swing the pawl out of engagement with the teeth.

4. In a device of the character described the combination with the rack bar and a cylindrical member through which it extends, of a guide plate secured in the cylindrical member, a supporting shelf on one end of the guide plate engageable with the teeth of the rack bar, a handle member secured to the cylinder to impart a turning movement thereto, and spring actuated means also adapted to impart a turning movement thereto.

5. In a device of the character described a cylindrical pawl, a pair of bearing members supporting the same, opposed slots formed in the cylindrical member, a guide plate extending therethrough and secured in the cylindrical pawl, a bearing plate on one end of the guide plate, a rack bar extending through the slots and guided by the guide plate, a rod extending through the cylindrical pawl, a spring attached to one end of the rod, and an operating lever on the opposite end of the rod.

6. In a device of the character described the combination with the rack bar and the tubular cylindrical member through which the rack bar extends, of a guide plate secured in the cylindrical member and extending therethrough, a supporting shelf on one end of the guide plate adapted to support the teeth of the rack bar, spring actuated means adapted to impart a turning movement to the cylindrical sleeve in one direction, and other means for imparting a turning movement to said sleeve in the opposite direction.

DAVID W. DORRANCE.